(12) United States Patent
Zhao et al.

(10) Patent No.: US 10,308,120 B2
(45) Date of Patent: Jun. 4, 2019

(54) OPTIMIZING REGENERATIVE BRAKING EFFICIENCY IN A HYBRID VEHICLE

(71) Applicant: Ford Global Technologies, LLC, Dearborn, MI (US)

(72) Inventors: Yanan Zhao, Ann Arbor, MI (US); Ming Lang Kuang, Canton, MI (US); Zheng Liu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 15/485,845

(22) Filed: Apr. 12, 2017

(65) Prior Publication Data

US 2018/0297475 A1    Oct. 18, 2018

(51) Int. Cl.
*B60L 7/26* (2006.01)
*B60L 7/18* (2006.01)
(Continued)

(52) U.S. Cl.
CPC ............ *B60L 7/26* (2013.01); *B60L 7/18* (2013.01); *B60T 7/22* (2013.01); *B60T 8/172* (2013.01);
(Continued)

(58) Field of Classification Search
CPC .......... B60L 7/26; B60L 7/18; B60L 2240/12; B60L 2240/16; B60L 2240/423;
(Continued)

(56) References Cited

U.S. PATENT DOCUMENTS 5,895,100 A * 4/1999 Ito .......................... B60L 7/26
                                                      303/152
7,647,997 B2   1/2010 Oliver
                     (Continued)

FOREIGN PATENT DOCUMENTS

JP          10243501 A  *  9/1998
JP        2014100999 A  *  6/2014

OTHER PUBLICATIONS

Liang et al., "Optimal Regenerative Torque Control to Maximize Energy Recapture of Electric Vehicles," Year: 2010, pp. 1-6.*
(Continued)

*Primary Examiner* — Tuan C To
(74) *Attorney, Agent, or Firm* — David Kelley; Brooks Kushman P.C.

(57) ABSTRACT

An autonomous or semi-autonomous vehicle is provided that is capable of braking itself without a driver depressing the brake pedal. The vehicle has a powertrain that includes an engine, a transmission, and a motor with a connected battery to provide regenerative braking capabilities. Friction brakes are provided to apply when necessary, such as when the battery has a high state of charge and further regenerative braking would overcharge the battery. The braking may be activated in response to a sensor detecting a distance to an object in front of the vehicle. A vehicle controller is programmed to automatically control amounts of regenerative braking and friction braking during a braking event based on a comparison between a regenerative torque limit of the powertrain and a desired brake torque over the brake event to safely brake the vehicle during the brake event.

20 Claims, 7 Drawing Sheets

(51) Int. Cl.
*B60T 8/172* (2006.01)
*B60T 7/22* (2006.01)

(52) U.S. Cl.
CPC ....... *B60L 2240/12* (2013.01); *B60L 2240/16* (2013.01); *B60L 2240/423* (2013.01); *B60L 2240/486* (2013.01); *B60L 2240/54* (2013.01); *B60L 2250/26* (2013.01); *B60T 2201/02* (2013.01); *B60T 2201/022* (2013.01); *B60T 2260/04* (2013.01); *B60T 2270/604* (2013.01)

(58) Field of Classification Search
CPC ........... B60L 2240/486; B60L 2240/54; B60L 2250/26; B60T 8/172; B60T 2270/604
USPC .......................................................... 701/70
See application file for complete search history.

(56) References Cited

U.S. PATENT DOCUMENTS

| | | | | |
|---|---|---|---|---|
| 2003/0006076 A1* | 1/2003 | Tamor | ................... | B60W 20/10 180/65.25 |
| 2004/0122579 A1* | 6/2004 | Ashizawa | ................ | B60L 7/26 701/70 |
| 2008/0100129 A1* | 5/2008 | Lubbers | .................. | B60K 6/48 303/113.1 |
| 2010/0113214 A1* | 5/2010 | Krueger | ................. | B60K 6/365 477/28 |
| 2010/0113215 A1* | 5/2010 | Jager | ........................ | B60L 7/26 477/29 |
| 2010/0138117 A1* | 6/2010 | Witte | ........................ | B60L 7/24 701/48 |
| 2010/0179010 A1* | 7/2010 | Kuzuya | ................. | B60W 20/40 475/5 |
| 2012/0203406 A1* | 8/2012 | Akebono | .............. | B60W 10/02 701/22 |
| 2012/0299367 A1* | 11/2012 | Ross | ...................... | B60T 8/4872 303/3 |
| 2013/0162009 A1* | 6/2013 | Mitts | ....................... | B60L 3/102 303/3 |
| 2014/0350789 A1* | 11/2014 | Anker | ................... | B62D 15/025 701/41 |
| 2015/0375747 A1 | 12/2015 | Shishido et al. | | |
| 2016/0039292 A1* | 2/2016 | Takahashi | ............. | B60W 10/08 701/70 |
| 2016/0121727 A1* | 5/2016 | Kim | ......................... | B60L 7/26 701/70 |
| 2016/0176413 A1 | 6/2016 | Oguri | | |
| 2017/0144651 A1* | 5/2017 | Park | ...................... | B60W 20/15 |
| 2017/0151940 A1* | 6/2017 | Nakamura | ........... | B60W 20/15 |
| 2017/0257055 A1* | 9/2017 | Kitaori | ................... | B60L 50/61 |
| 2018/0079313 A1* | 3/2018 | Foitzik | ................. | B60T 8/4081 |
| 2018/0093571 A1* | 4/2018 | Hall | ...................... | B60T 1/10 |
| 2018/0093572 A1* | 4/2018 | Hall | ......................... | B60T 1/10 |
| 2018/0154777 A1* | 6/2018 | Hall | .......................... | B60L 7/26 |

OTHER PUBLICATIONS

Yu et al., "Regenerative Braking Torque Estimation and Control Approaches for a Hybrid Electric Truck," Year: 2010, pp. 5832-5837.*

* cited by examiner

OPTIMIZING REGENERATIVE BRAKING EFFICIENCY IN A HYBRID VEHICLE

TECHNICAL FIELD

This disclosure relates to optimizing regenerative braking efficiency in a vehicle equipped with both regenerative braking and friction braking. More specifically, this disclosure relates to a fully-autonomous or semi-autonomous vehicle that automatically activates a braking event in a manner that attempts to optimize the amount of energy recaptured via regenerative braking during the braking event.

BACKGROUND

Autonomous vehicles and semi-autonomous vehicles are under rapid recent development. This includes limited self-driving automation (semi-autonomous) and full self-driving automation (fully autonomous). The concept of automatic driving and control of the vehicle from various sensors and software provides further opportunities to improve the fuel economy of vehicles. Opportunities for improving fuel economy exists in hybrid vehicles as well, in which timing and magnitude of application of regenerative braking can lead to improved fuel efficiencies. It follows that an autonomous vehicle (including semi-autonomous vehicles) can be improved in fuel efficiency if the braking of the vehicle is properly automatically controlled.

SUMMARY

According to one embodiment, a vehicle includes a powertrain that includes a battery and a motor/generator configured to perform regenerative braking. The vehicle also includes a sensor configured to detect a distance to an external object, such as another vehicle, a stop sign, a stop light, etc. The vehicle includes a controller programmed to initiate regenerative braking without friction braking for a braking event in response to (i) the distance falling below a threshold, and (ii) a magnitude of powertrain regenerative torque limit being predicted to exceed a magnitude of average desired brake torque for the braking event.

In another embodiment, a vehicle includes a powertrain having a battery, a motor/generator configured to perform regenerative braking, and a transmission. The vehicle also includes friction brakes, as well as a sensor configured to detect a distance to an external object. The vehicle includes a controller programmed to command an amount of friction braking and modulate the regenerative braking for a braking event in response to (i) the distance falling below a threshold, and (ii) a magnitude of average desired brake torque predicted to exceed a magnitude of powertrain regenerative torque limit for the braking event.

In yet another embodiment, an autonomous vehicle includes a powertrain having an engine, a transmission, and a motor separately selectively coupled to the engine and the transmission and capable of performing regenerative braking. The autonomous vehicle also includes friction brakes, and a sensor configured to detect a distance to an object in front of the vehicle. A vehicle controller is programmed to automatically control amounts of regenerative braking and friction braking during a brake event based on a comparison between a regenerative torque limit of the powertrain and an average desired brake torque to safely perform the brake event.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
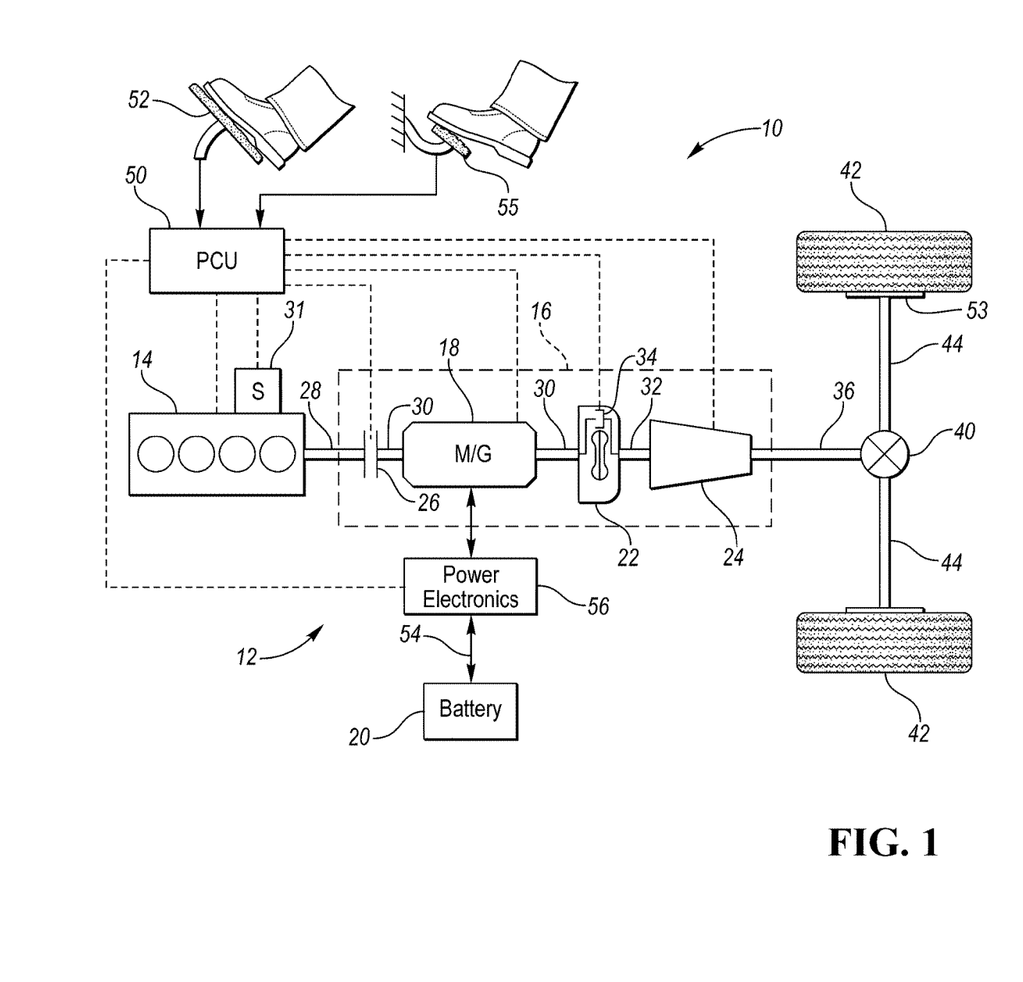
FIG. 1 is a schematic of a hybrid electric vehicle, according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Along with regenerative braking capabilities, the vehicle 10 is also provided with conventional friction brakes 53 at the wheels which, like the regenerative braking, can be activated autonomously or by depression of a brake pedal 55. These can be controlled by, for example, a hydraulic brake system. The friction brakes can selectively provide the braking force for the vehicle, depending on the availability of the regenerative braking system. The amount of friction braking can vary. For example, if the state of charge of the battery 20 is relatively high (e.g., above a high threshold), then regenerative braking may be disabled for at least a portion of the braking event in order to prevent overcharging of the battery. Instead, the friction brakes can be activated to slow the vehicle. In certain braking situations, such as those described below, the friction braking can be used to supplement the regenerative braking, or vice versa, to provide an overall brake force necessary to brake the vehicle while also maximizing the amount of regenerative braking.

Autonomous and semi-autonomous vehicles have an ability to automatically command and control the brakes of the vehicle without driver initiation. The vehicle may be equipped with a sensor configured to detect a distance to an external object (a stop sign, another vehicle, a stop light, etc.) that the vehicle is approaching. The sensor may be equipped with capabilities to detect the external object with radar, long-range radar, lidar, a camera, etc.

Figure 2A:
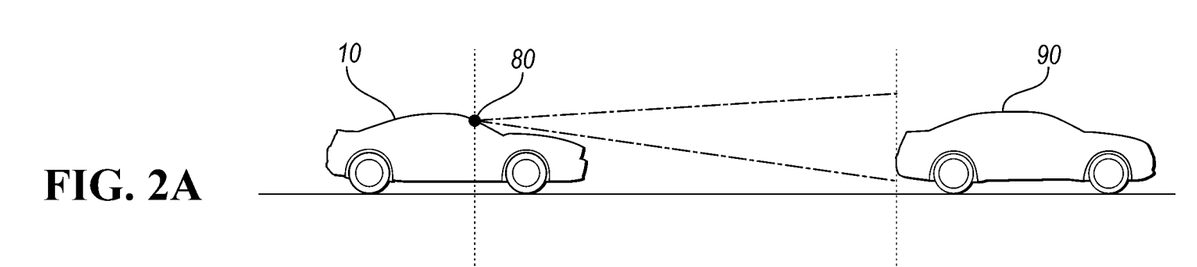
FIG. 2A is a schematic view of the vehicle equipped with a sensor configured to detect a distance to another vehicle in front of the vehicle.
Figure 2B:
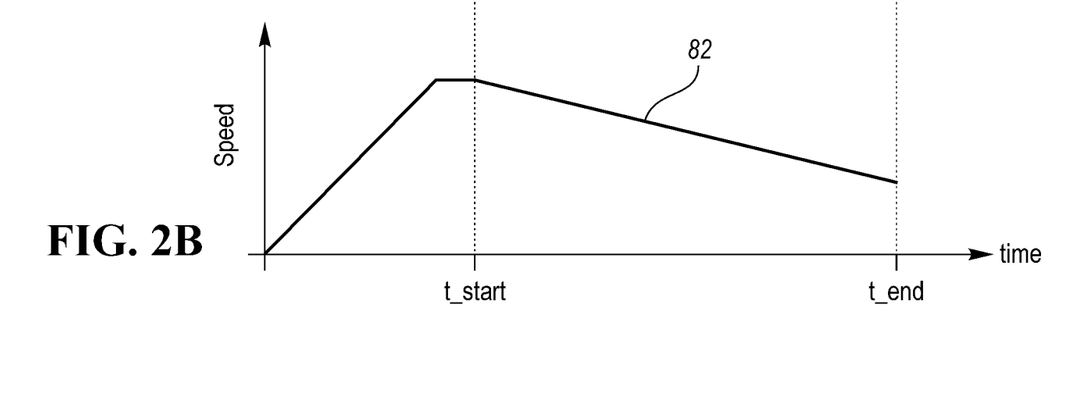
FIG. 2B is a graph of a desired vehicle deceleration rate, which can be the derivative of vehicle speed when the vehicle speed is decreasing, during that distance to safely stop the vehicle, according to one embodiment.

FIG. 2 shows an exemplary driving scenario in which the vehicle 10 is provided with such a sensor 80 coupled to the controller described above. The vehicle 10 is following a leading vehicle 90 in front of the vehicle 10. Based on the information gathered from the sensor, the vehicle needs to slow down to keep a safe distance from the leading vehicle. The controller associated with the sensor 80 may define a necessary deceleration rate 82 in order to safely slow the vehicle 10 at a rate such that the vehicle 10 will safely stop before reaching the leading vehicle 90. The time to safely brake the vehicle 10 is dependent on the speed of the vehicle 10 and the distance to the leading vehicle. The controller can construct the deceleration of the vehicle to occur over the necessary time (i.e., between t_start and t_end).

The present disclosure provides a control strategy for constructing a vehicle speed deceleration rate by using regenerative braking (and friction braking, if necessary) to safely brake the vehicle 10 while maximizing the amount of regenerative braking performed during the automatically-initiated braking event.

Figure 3:
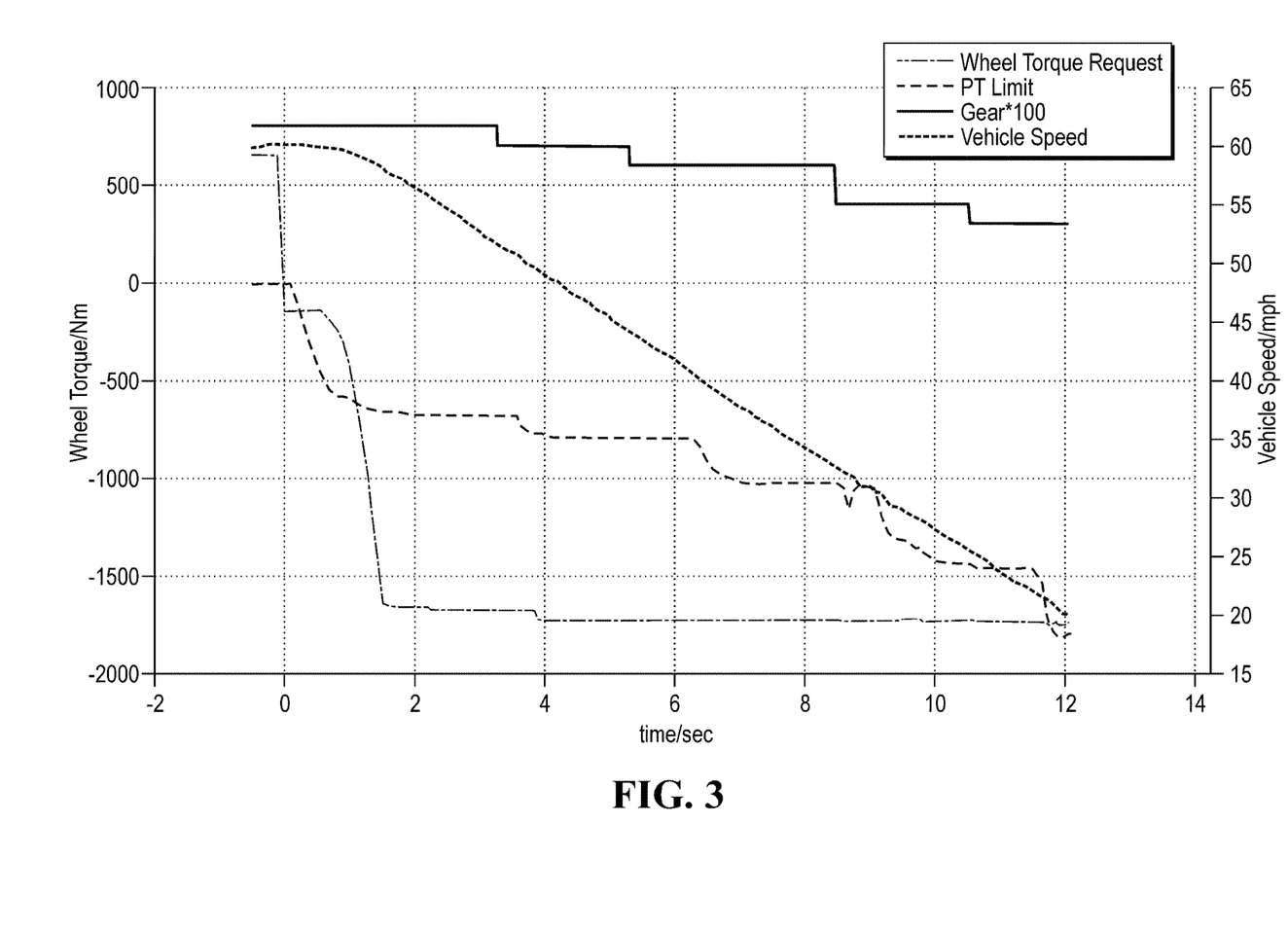
FIG. 3 is a graph showing a braking event with a requested wheel torque, a regenerative braking limit of the powertrain, a gear ratio, and a speed of the vehicle over time during the braking event, according to one embodiment.

In normal driving operations, the amount of regenerative braking capable of being performed is limited by and can be predicted by the characteristics of the powertrain. This is referred to herein as the powertrain regenerative torque limit, or PT limit. The characteristics that limit the powertrain regenerative torque limit include the state of charge of the battery 20, the regenerative torque limits of the M/G 18, the brake stability limit (e.g., from the brake control module indicating vehicle's stability consideration (ABS)), and the transmission's capability to support regenerative braking. The transmission's capability to support regenerative braking is gear-dependent for vehicles with the architecture of the vehicle 10 shown in FIG. 1, and can be a dominant factor at high gears. FIG. 3 shows an example of the powertrain regenerative torque limit throughout a braking event (i.e., from t=0 to t=12). As can be seen, the powertrain regenerative torque limit goes through various jumps as the transmission downshifts in gear ratios. Also shown in FIG. 3 is the vehicle speed at a generally constant deceleration rate throughout the braking event, as well as the wheel torque request (i.e., the overall brake torque provided at the wheels). When the overall brake torque provided at the wheels is more negative than the powertrain regenerative torque limit (as shown between approximately t=1.5 s and t=11.8 s), friction braking must be utilized to keep the vehicle speed at its constant deceleration rate. In order to maximize the amount of regenerative braking performed to recapture as much energy as possible, regenerative braking would be performed to equal the powertrain regenerative torque limit (the area above the PT Limit line), and friction braking would be utilized for the remaining torque required (the area between the PT Limit line and the Wheel Torque Request line).

Accordingly, the present disclosure provides various embodiments to accomplish the braking event while recapturing as much regenerative braking as possible while still braking the vehicle appropriately and at a generally constant deceleration rate that is optimal for driver experience.

Figure 4:
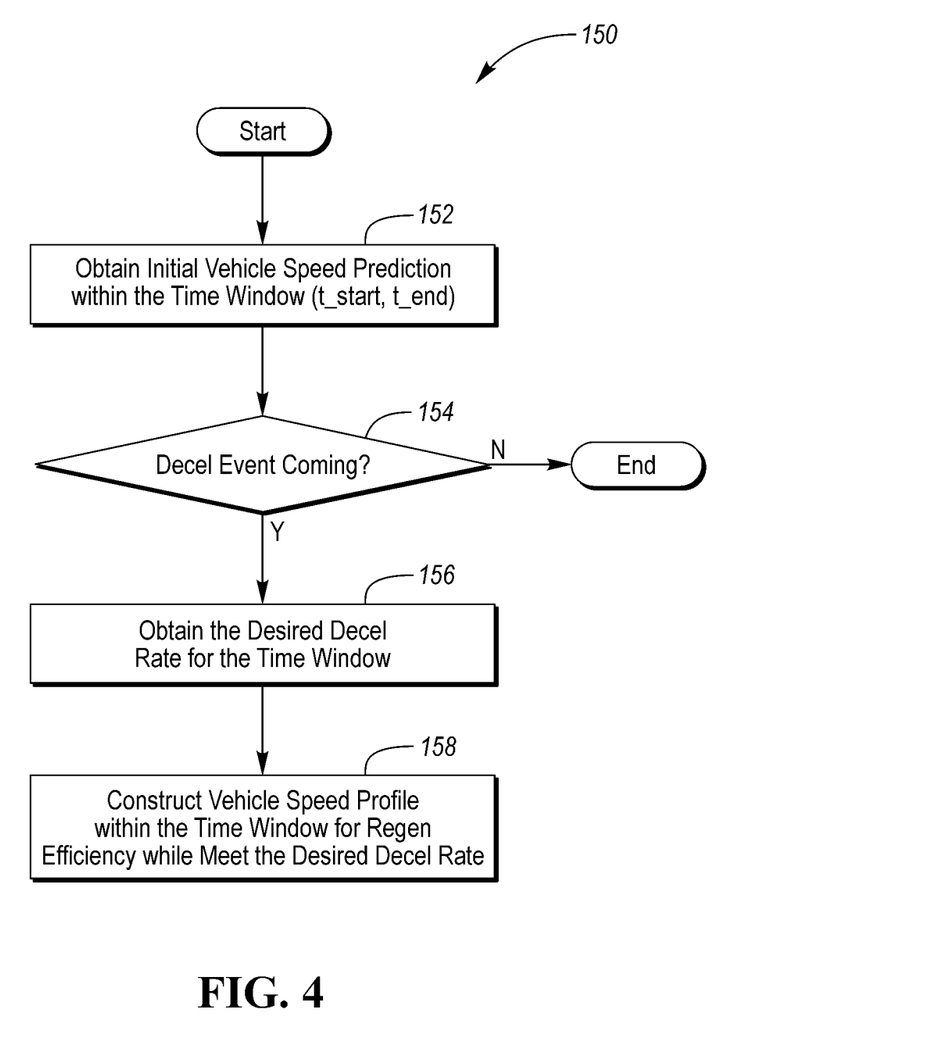
FIG. 4 is flowchart illustrating one exemplary algorithm implemented by a controller onboard the vehicle.

A vehicle speed and/or associated brake torque request can be constructed by the controller to meet an average deceleration rate considering the regenerative braking efficiency, as shown in FIG. 4. An algorithm 150 is provided in FIG. 4 for constructing a speed profile for the vehicle 10 during a braking event. The algorithm, like others described in this disclosure, can be implemented by the controller explained above. First, at 152, the controller utilizes data received from the sensor 80 to determine an initial vehicle speed prediction within the time window (t_start, t_end) to safely brake the vehicle. If there is no necessary braking event, then the algorithm returns to the beginning and constantly monitors the speed of the vehicle and the distance to objects in front of the vehicle. If a braking event is required (i.e., "Decel Event Coming?") at 154, then at 156 the controller determines a desired deceleration rate for the time window to safely stop the vehicle. At 158, the controller also constructs a vehicle speed profile within the time window for regenerative braking efficiency while meeting the desired deceleration rate. In other words, the controller can construct various speed profiles that all have the same average deceleration rate, understanding that some speed profiles can yield more regenerative braking than others while sacrificing a small delineation from a perfectly constant deceleration rate. For example, it may be desirable to brake the vehicle with a first brake torque, and then later in the braking event, brake the vehicle with a second, larger brake torque in order to recapture more electric energy from regenerative braking during the braking event.

Figure 5A:
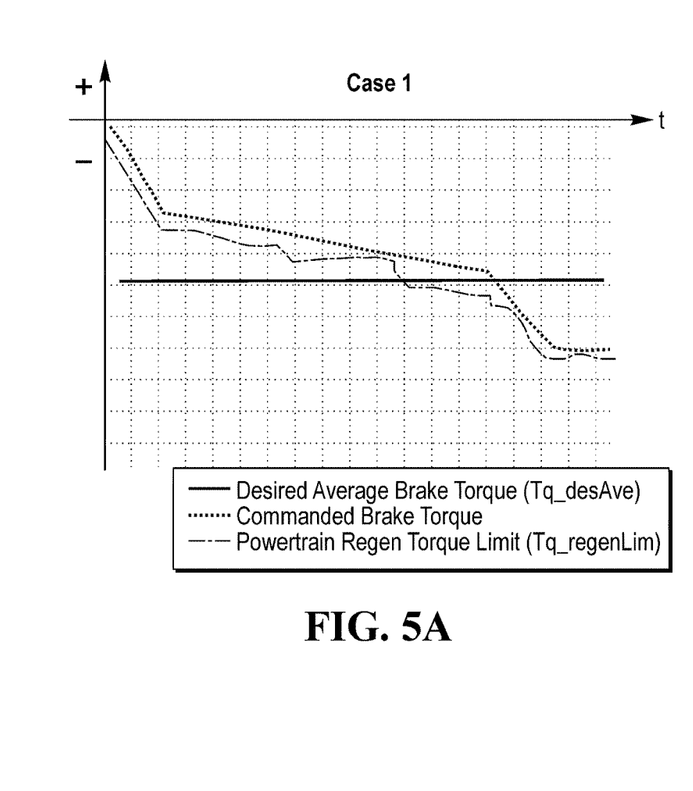
FIG. 5A is a graph of a first braking event with a powertrain regenerative torque limit, along with a desired average brake torque that is sometimes more negative than the regenerative torque limit and sometimes less negative than the powertrain regenerative torque limit, resulting in a commanded brake torque according to one embodiment.
Figure 5B:
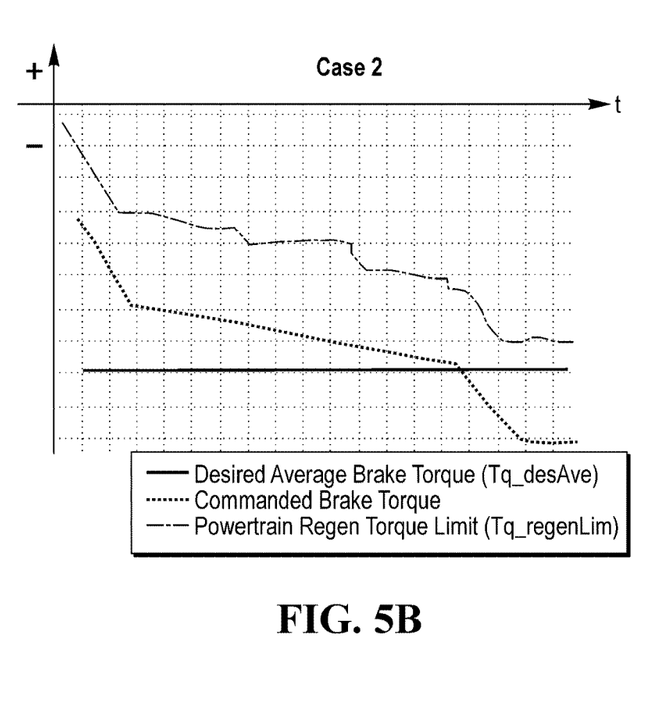
FIG. 5B is a graph of another braking event with the same powertrain regenerative torque limit, this time with another desired average brake torque that is entirely more negative than the regenerative torque limit throughout the braking event, resulting in another commanded brake torque according to another embodiment.

Using the teachings provided above, the controller can (1) establish that a braking event should automatically take place, (2) determine the powertrain regenerative torque limit for each gear ratio during the upcoming braking event, (3) determine a necessary deceleration rate required to successfully stop the vehicle within the time window before contacting the forward vehicle, and (4) determine the average desired or necessary brake torque during the braking event to successfully stop the vehicle. Two use cases are illustrated in FIGS. 5A and 5B. In FIG. 5A, Case 1 is illustrated in which the desired average brake torque (Tq_desAve) (which is derived from the desired deceleration rate) is partially less negative than the powertrain regenerative torque limit (Tq_regenLim). In other words, the controller predicts that during a first part of the braking event, the magnitude of the powertrain regenerative torque limit is less than the magnitude of the desired average brake torque, and during a second part of the braking event, the magnitude of the powertrain regenerative torque limit exceeds the magnitude of the desired average brake torque.

It should be noted that in describing these figures and the relationships between the values, the torque values are illustrated as negative values because they are brake torques ("negative torques"). When a first value is "more negative" than a second value, it is intended to mean that the magnitude or absolute value of the first value exceeds the magnitude or absolute value of the second value. One of skill in the art should also recognize that when a first negative torque value is said to exceed a second negative torque value, it is intended to mean that the first negative torque value is more negative than the second negative torque value.

In FIG. 5B, Case 2 is illustrated in which the desired average brake torque (Tq_desAve) (which is derived from the desired deceleration rate) is always more negative than the powertrain regenerative torque limit. In other words, the controller predicts that the magnitude of the desired average brake torque exceeds the magnitude of the powertrain regenerative torque limit for the entirety of the upcoming braking event.

Figure 6A:
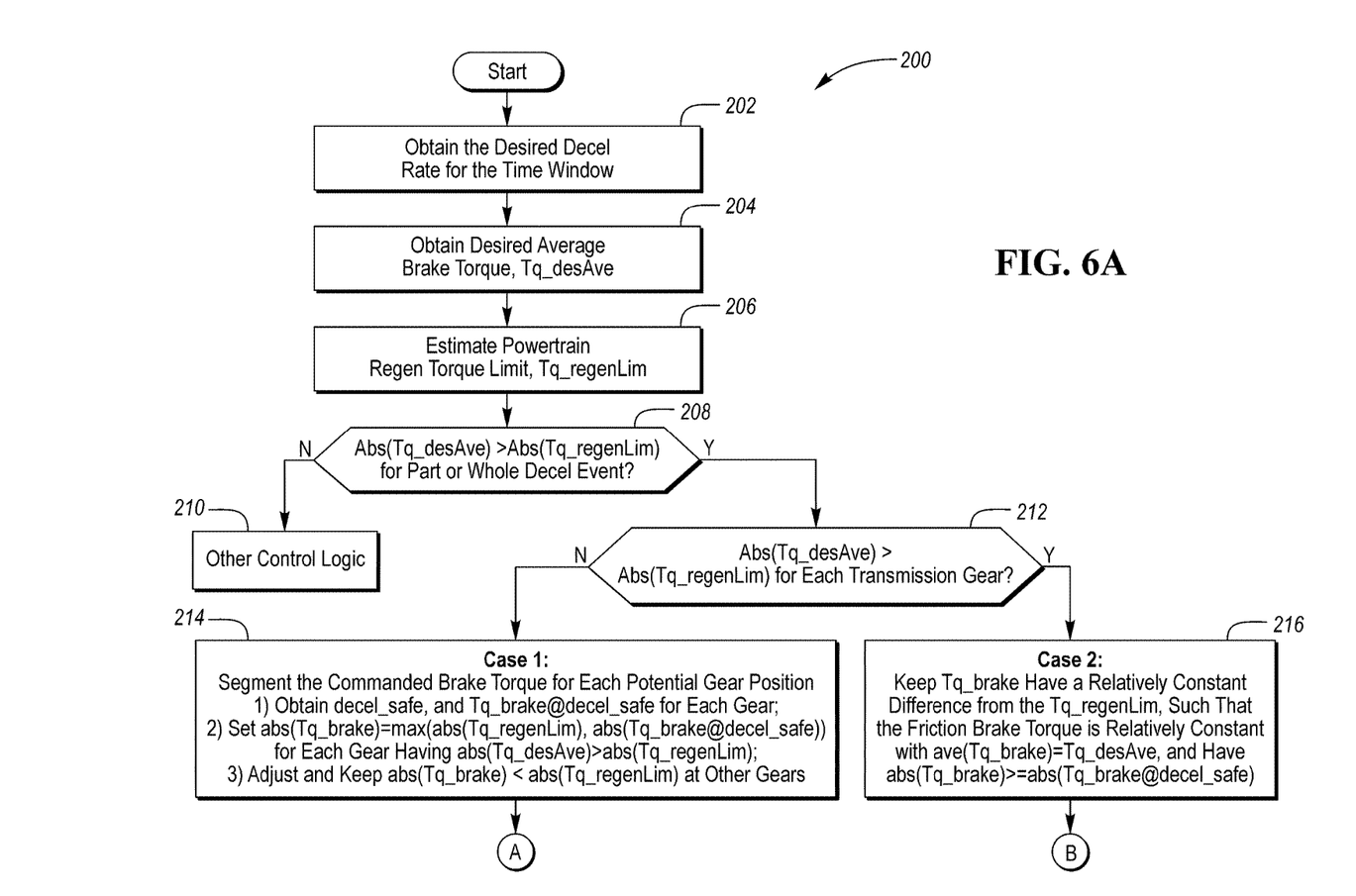
FIGS. 6A-6B is another flowchart illustrating another exemplary algorithm implemented by the controller onboard the vehicle.
Figure 6B:
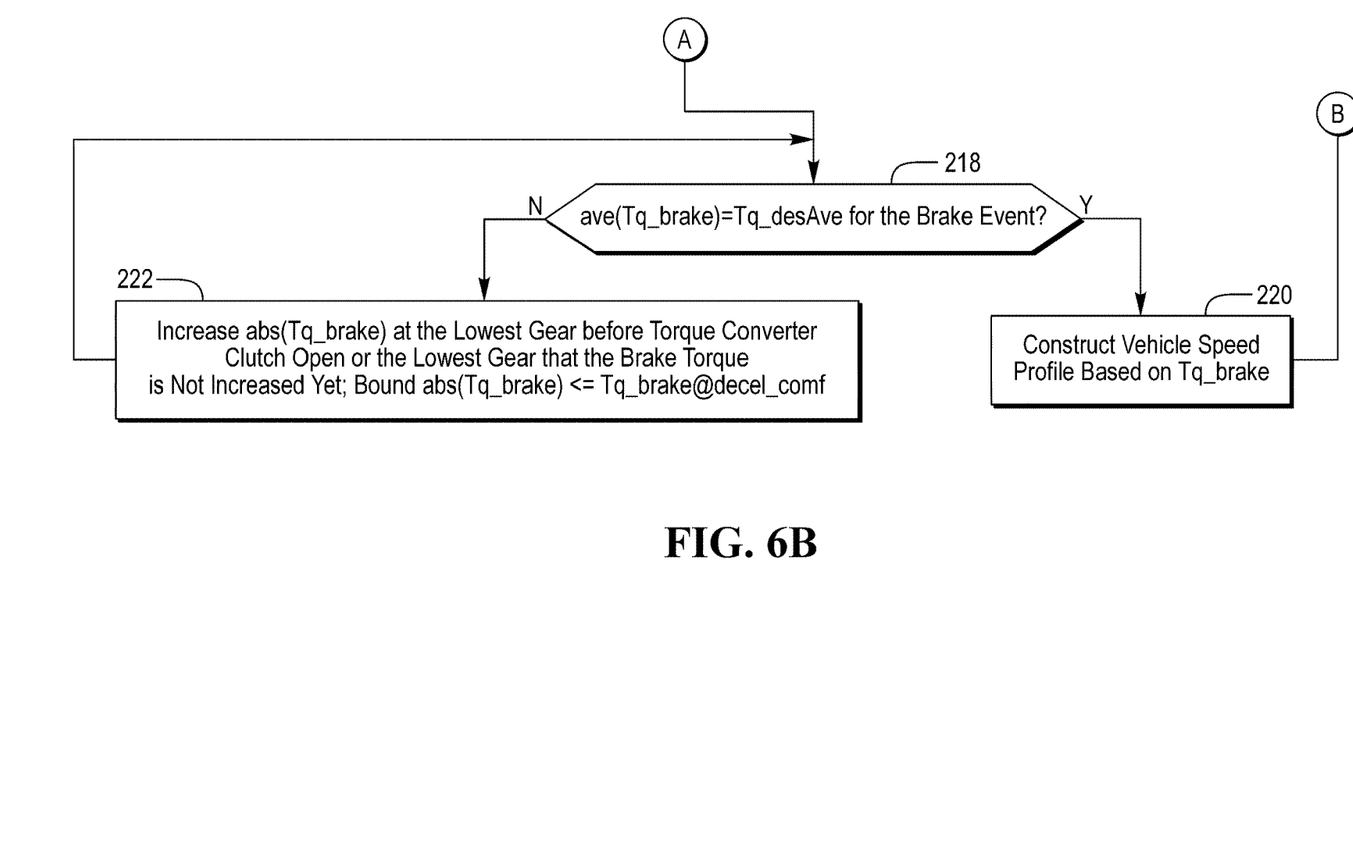

FIGS. 6A and 6B illustrate a flow chart of an algorithm 200 implemented by the controller to construct vehicle speed profiles, deceleration profiles, and brake torque profiles depending on which Case is predicted to occur during the braking event. Once the algorithm is started, at 202 the controller obtains the desired deceleration rate for the time window, similar to step 156 above. At 204, the controller determines the desired average brake torque (Tq_desAve), either friction braking and/or regenerative braking, necessary to successfully stop the vehicle within the time frame. At 206, the controller estimates the powertrain regenerative torque limit (Tq_regenLim) described above.

At 208, the controller compares the magnitude or absolute value of the desired average brake torque to the magnitude or absolute value of the powertrain regenerative torque limit. If the magnitude of the desired average brake torque does not exceed the magnitude of the powertrain regenerative torque limit, other control logic is sued at 210. If, however, magnitude of the desired average brake torque exceeds the magnitude of the powertrain regenerative torque limit, then the algorithm proceeds to 212.

At 212, the controller compares the magnitude of the desired average brake torque to the magnitude of the powertrain regenerative torque limit for each transmission gear, realizing that the powertrain regenerative torque limit alters with each gear the transmission enters, as explained above. Case 1 described above is entered at 214 if the magnitude of the desired average brake torque does not exceed the magnitude of the powertrain regenerative torque limit for at least some of the transmission gears for the upcoming braking event (e.g., each successive gear potentially utilized in the braking event, has described herein). Case 2 described above is entered at 216 if the magnitude of the desired average brake torque exceeds the magnitude of the powertrain regenerative torque limit for each transmission gear for the upcoming braking event.

In another embodiment, the decision at 212 is whether or not the average of the magnitude of the powertrain regenerative torque limit is above the magnitude of the desired average brake torque. In yet another embodiment, the decision at 212 is whether or not a difference between the average of the magnitude of the powertrain regenerative torque limit and the magnitude of the desired average brake torque exceeds some predetermined threshold.

If Case 1 is selected at 214, the controller can segment the upcoming or predicted commanded brake torque for each potential gear position. A safe deceleration rate (decel_safe) is determined, which is the minimum deceleration rate to force the vehicle to brake and stop with a minimum safe distance from the lead vehicle or external object in front of the vehicle. A corresponding brake torque is calculated by the controller for each gear (Tq_brake@decel_safe). The magnitude of the brake torque is set to be the maximum of the magnitude of the powertrain regenerative torque limit and the magnitude of the corresponding brake torque abs (Tq_brake)=max(abs(Tq_regenLim), abs (Tq_brake@decel_safe)) for each gear in which the magnitude of the desired average brake torque (Tq_desAve) exceeds the magnitude of the powertrain regenerative torque limit (Tq_regenLim). If the magnitude of the corresponding brake torque (Tq_brake@decel_safe) is more than that of the powertrain regenerative torque limit (Tq_regenLim), then the corresponding brake torque (Tq_brake@decel_safe) should be used for each gear in which the relationship is true. At other gears in which the relationship is not true, the magnitude of the desired torque or brake torque request (Tq_brake) is adjusted while being kept below the powertrain regenerative torque limit. This process at 214 allows regenerative braking to be utilized for a majority or the entirety of the upcoming braking event, even when the magnitude of the powertrain regenerative torque limit only exceeds the required brake torque requests for part of the braking event. (See FIG. 5A described above). Friction braking can be used at the end or near end of the braking event (e.g., when the vehicle speed is below 5 mph) to complete the braking event and bring the vehicle to a stop.

Following the algorithm to 218 in FIG. 6B, the controller determines whether the average commanded brake torque for the braking event (ave(Tq_brake)) is equal to the desired average brake torque (Tq_desAve). In other words, the controller determines whether the average desired average brake torque can be met by the average commanded brake torque. If so, then at 220 the design of the brake torque for the upcoming braking event is complete, and the vehicle speed profile can be constructed based on the desired torque or brake torque requests (Tq_brake) for the braking event. Otherwise, at 222, the desired torque or brake torque request (Tq_brake) at the lowest gear before the torque converter clutch 34 is open is set to be more negative. A comfortable or gradual deceleration rate (decal_comf) can be used to bound how much brake torque can be increased at this gear (Tq_brake@decel_comf). If the desired average brake torque still cannot be met after this increase, then the designed brake torque (Tq_brake) at the next lowest gear can be increased as stated above. This process can be repeated until the desired brake torque can be met.

If Case 2 is selected at 216 (e.g., when the magnitude of the desired average brake torque (Tq_desAve) exceeds the magnitude of the powertrain regenerative torque limit (Tq_regenLim) for the entirety of the braking event), then the designed or commanded brake torque (Tq_brake) can roughly follow, but have a relatively constant difference from the powertrain regenerative torque limit throughout the braking event. FIG. 5B illustrates one of such scenarios in which the designed or commanded brake torque (Tq_brake) roughly follows while being more negative than the powertrain regenerative torque limit throughout the braking event. During this time, the friction braking can be activated for this use case. The friction braking can be activated to take a generally constant magnitude through the entire braking event, allowing the regenerative braking to fill in and modulate throughout the braking event to meet the required brake torque. In this case, the torque bound by the safe deceleration rate (Tq_brake@decel_safe) should also be checked by the controller such that the planned braking effort for the braking event will always keep the vehicle at a safe distance from the lead vehicle or external object. The small variation or generally constant friction brake application helps regenerative and friction brake coordination because it reduces the effort, energy, and time for the hydraulic system to respond to friction brake variation.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
a powertrain including a battery and a motor/generator configured to perform regenerative braking; and
a controller programmed to request regenerative braking without friction braking until an end or near end of an upcoming braking event in response to a magnitude of a powertrain regenerative torque limit predicted to exceed a magnitude of average desired brake torque for a portion of braking event.

2. The vehicle of claim 1, wherein the controller is programmed to request the regenerative braking without the friction braking in response to the magnitude of the powertrain regenerative torque limit predicted to exceed the magnitude of average desired brake torque for only a portion and not the entirety of the braking event.

3. The vehicle of claim 1, wherein the powertrain regenerative torque limit is based on a regenerative torque limit of the motor/generator, a state of charge of the battery, and a regenerative limit of a transmission that varies depending on an operating gear of the transmission.

4. The vehicle of claim 1, wherein the average desired brake torque is an average of a brake torque necessary to properly stop or slow the vehicle over a distance that depends on a location of a detected external object.

5. The vehicle of claim 1, wherein the controller is further programmed to request the regenerative braking without the friction braking until the end of the braking event based on a magnitude of an average of the powertrain regenerative torque limit predicted to exceed a magnitude of an average desired brake torque for the braking event.

6. The vehicle of claim 1, wherein the vehicle further comprises friction brakes, and the controller is further programmed to initiate the friction braking while reducing the regenerative braking at the end or near end of the braking event.

7. The vehicle of claim 1, further comprising a sensor configured to detect a distance to an external object, and the controller is further programmed to request the regenerative braking without friction braking in response to the distance being below a threshold.

8. A vehicle comprising:
a powertrain including a battery, a motor/generator configured to perform regenerative braking, and a transmission;
friction brakes; and
a controller programmed to hold friction braking steady while modulating a magnitude of the regenerative braking during a braking event in response to a magnitude of average desired brake torque predicted to exceed a magnitude of powertrain regenerative torque limit for the entire braking event.

9. The vehicle of claim 8, further comprising a sensor configured to detect a distance to an external object, and the controller is further programmed to initiate the friction braking and regenerative braking in response to the distance being below a threshold.

10. The vehicle of claim 9, wherein the controller is further programmed to alter the threshold based on a speed of the vehicle.

11. The vehicle of claim 8, wherein the regenerative torque limit is based on a regenerative torque limit of the motor/generator, a state of charge of the battery, and a regenerative limit of the transmission that varies depending on an operating gear of the transmission.

12. The vehicle of claim 8, wherein the average desired brake torque is an average of a brake torque necessary for the entire braking event.

13. The vehicle of claim 8, wherein the controller is programmed to modulate the magnitude of the regenerative braking such that a difference between the magnitude of regenerative braking and a commanded brake torque remains generally constant.

14. The vehicle of claim 8, further comprising an engine selectively coupled to the motor/generator via a clutch.

15. An autonomous vehicle comprising:
   a powertrain including:
      an engine,
      a transmission, and
      a motor separately selectively coupled to the engine and the transmission and capable of performing regenerative braking;
   fiction brakes;
   a sensor configured to detect a distance to an object in front of the vehicle; and
   a controller programmed to automatically control amounts of regenerative braking and friction braking during a braking event based on a predictive comparison at a beginning of the braking event between a regenerative torque limit of the powertrain and an average desired brake torque until an end of the braking event dependent on the distance.

16. The vehicle of claim 15, wherein the controller is further programmed to hold the friction braking constant and modulate the regenerative braking during the braking event.

17. The vehicle of claim 15, wherein the regenerative torque limit of the powertrain is dependent upon a gear ratio the transmission is operating in.

18. The vehicle of claim 15, wherein the controller is further programmed to control the regenerative braking and the friction brakes based on a desired average brake torque necessary to stop or slow the vehicle within the distance.

19. The vehicle of claim 18, wherein the desired average brake torque is derived from a desired deceleration based on the distance.

20. The vehicle of claim 18, wherein the controller is further programmed to command a relatively constant amount of frictional braking while modulating the regenerative braking in response to a magnitude of the desired average brake torque exceeding a magnitude of the regenerative torque limit of the powertrain for the braking event.

* * * * *